Figure 1:
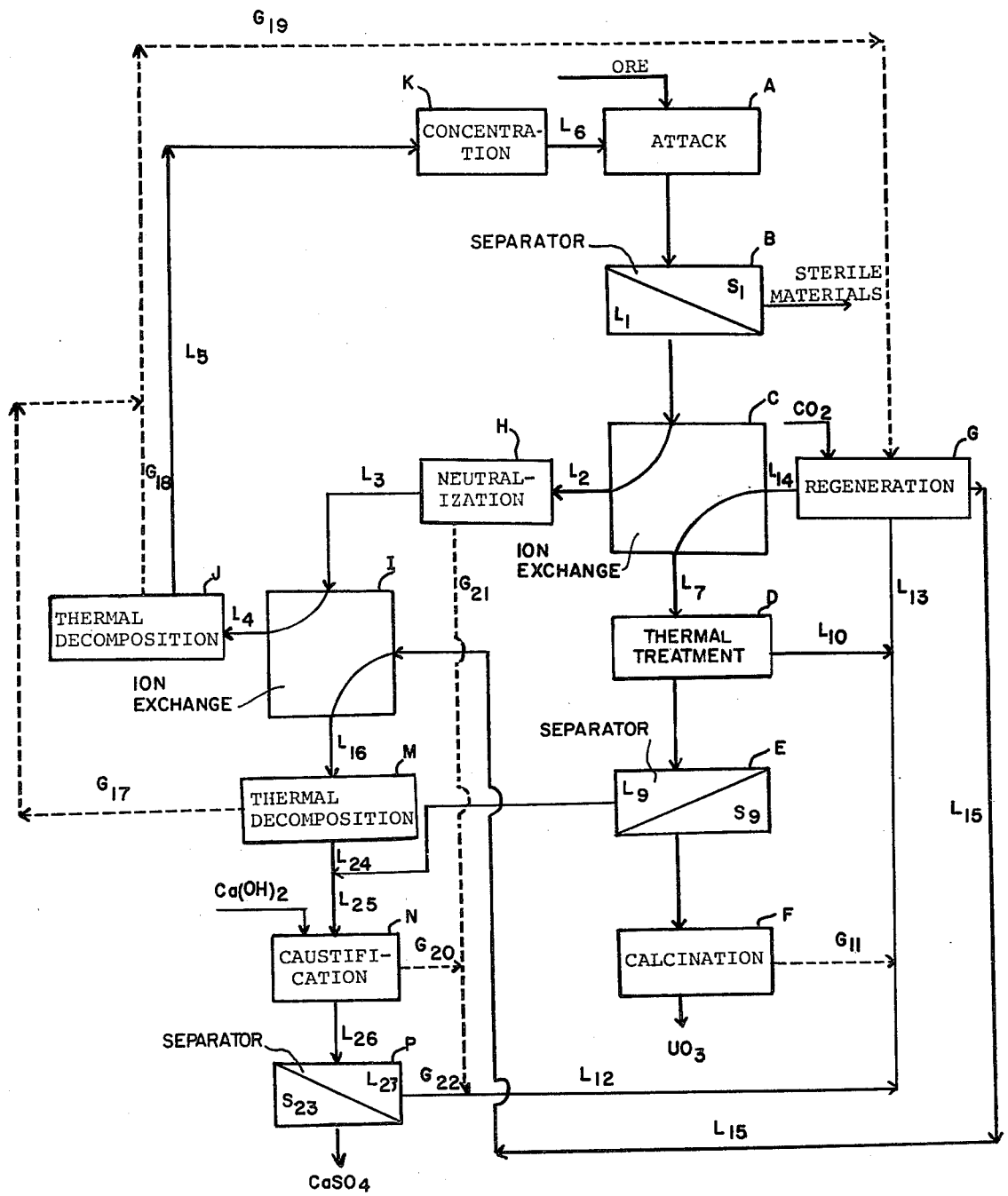

United States Patent [19]

Berger

[11] 4,305,911

[45] Dec. 15, 1981

[54] NON-POLLUTING TREATMENT OF URANIFEROUS EFFLUENTS ORIGINATING FROM AN ALKALINE ATTACK OF A SULPHUR-CONTAINING URANIUM ORE

[75] Inventor: Bernard Berger, Tassin La Demi Lune, France

[73] Assignee: Pechiney Ugine Kuhlmann, Paris, France

[21] Appl. No.: 6,331

[22] Filed: Jan. 25, 1979

[30] Foreign Application Priority Data

Feb. 8, 1978 [FR] France .............................. 78 04191

[51] Int. Cl.$^3$ ............................................ C01G 43/00
[52] U.S. Cl. .......................................... 423/7; 423/11; 423/17
[58] Field of Search .......................... 423/7, 11, 15, 17

[56] References Cited

U.S. PATENT DOCUMENTS

| | | | |
|---|---|---|---|
| 2,863,717 | 12/1958 | Kunin | 423/7 |
| 2,900,227 | 8/1959 | Dancy et al. | 423/7 |
| 2,982,605 | 5/1961 | Mouret et al. | 423/7 |
| 3,000,696 | 9/1961 | Teichmann | 423/7 |
| 3,445,201 | 5/1969 | Wheelwright | 423/7 |
| 3,961,027 | 6/1976 | Crossley | 423/7 |
| 4,233,272 | 11/1980 | Evesen et al. | 423/7 |

FOREIGN PATENT DOCUMENTS

| | | | |
|---|---|---|---|
| 2804907 | 8/1978 | Fed. Rep. of Germany | 423/7 |
| 1373734 | 12/1964 | France | 423/7 |
| 775415 | 5/1957 | United Kingdom | 423/7 |

OTHER PUBLICATIONS

Clegg et al., "Uranium Ore Processing", (Atoms for Peace Series), pp. 206-207, Addison-Wesley Publ. Co., Inc. (1958), Reading, Mass.

*Primary Examiner*—Edward A. Miller
*Attorney, Agent, or Firm*—McDougall, Hersh & Scott

[57] ABSTRACT

A cyclic process for the treatment of a uraniferous liquor containing, in addition to the desired metal, sodium carbonate and/or bicarbonate and sodium sulphate, obtained by the alkaline attack of a sulphur-containing uraniferous ore, the said process comprising fixing the uranium over a first strong anion-exchange resin, eluting it with an ammonium carbonate and/or bicarbonate solution in the form of an ammonium uranyl tricarbonate which is subsequently decomplexed, precipitating and calcinating the precipitated uranates and/or diuranates with regeneration of the eluant solution of ammonium carbonate and/or bicarbonate, passing the liquor which is freed from uranium and leaves the first strong anion-exchange resin into a neutralization zone then over a second anion-exchange resin, eliminating the $SO_4^=$ ions which are subsequently precipitated in calcium form, recycling a carbonate and/or bicarbonated liquor which is free from $SO_4^=$ ions to the attack of the ore, finally regenerating the elution liquor of $SO_4^=$ ions.

16 Claims, 1 Drawing Figure

NON-POLLUTING TREATMENT OF URANIFEROUS EFFLUENTS ORIGINATING FROM AN ALKALINE ATTACK OF A SULPHUR-CONTAINING URANIUM ORE

The invention relates to a new process for the non-polluting treatment of uraniferous effluents originating from the alkaline attack of a sulphur-containing uranium ore which allows, on the one hand, the extraction then the obtaining of relatively pure uranium and, on the other hand, treatment of the attacking liquor freed from uranium and containing alkaline carbonate and/or bicarbonate and sodium sulphate in aqueous solution, involving the selective extraction of the said sodium sulphate present and the recycling of the liquor which is free from $SO_4^=$ ions and which contains in solution only the alkaline carbonates and/or bicarbonates used, for the attack of the ore.

It has already been known for many years to dissolve the uranium contained in certain ores by means of an aqueous solution of alkaline carbonates and/or bicarbonates, to pass the liquor obtained after the attack over a strong anion-exchange resin so as to fix the uranium on the said resin, then, after passing the liquor, to collect the attacking liquor freed from its uranium and essentially containing excess alkaline carbonates and/or bicarbonates. The uranium fixed on the resin was then eluted by means of a solution of alkaline, or possibly ammonium, carbonates and/or bicarbonates and subsequently precipitated in the form of ammonium uranyl tricarbonate or again in the form of ammonium or sodium diuranates, in accordance with the various processes described very widely in the specialist literature.

However, when the uraniferous ore contained sulphur, all or part of this sulphur was transformed into sulphate during the attack and this sulphate passed into solution. Once the uranium had been extracted from the liquor originating from the attack by means of an ion-exchange resin, the majority of the sodium sulphate remained in solution in the uranium-free liquor.

Consequently, it was no longer possible to recycle to the attack the liquor which was free from uranium and contained in solution the alkaline carbonates and/or bicarbonates which had not reacted with the uranium during the attack of the ore.

Thus, the economical solution obtained involved throwing this liquor into the environment when it contained sodium sulphate. However, this liquor represented a considerable threat to the environment when thrown away, to such an extent that the various national laws have forbidden the practice.

Faced with such a situation, the applicants, in pursuing their research, have attempted and developed a new process for the treatment of a uraniferous liquor originating from the attack of a sulphur-containing ore which, as the result of a novel combination of known means, successively permits the uranium contained in this liquor to be separated, the liquor thus freed from uranium to be treated so as to separate the sulphate ions from it, and a solution of alkaline carbonates and/or bicarbonates which can be recycled to the attack of the ore to be obtained.

Generally speaking, the process according to the invention is characterised by the following stages:

(a) passing the uraniferous liquor containing, in addition to the desired metal, a mixture of alkaline carbonates and/or bicarbonates as well as sodium sulphate over a first strong anion-exchange resin of the quaternary ammonium type in carbonated form, preferably bicarbonated form, at a temperature of between ambient temperature and 60° C., (b) collecting the liquor which has been freed from uranium, (c) eluting the uranium fixed by a solution containing an ammonium carbonate and/or bicarbonate at a temperature between the ambient temperature and 60° C. in the form of a carbonated complex of the $UO_2(CO_3)_3(NH_4)_4$ type, (d) thermal decomplexion of the carbonated uraniferous complex at the boiling temperature of the solution, causing the uranium to precipitate in the form of ammonium uranate or diuranate with liberation of all the $CO_2$ and a proportion of ammonia gas in the presence of water vapour, subsequently regenerated in order to reconstitute the ammonium carbonate and/or bicarbonate, separating the uranium precipitate and the liquor now only containing ammonium sulphate, (f) recovering the ammonium sulphate liquor for a subsequent causticization treatment, (g) calcination of the uranium precipitate at a temperature of at most 400° C. under the conditions known to the skilled man and the liberation of ammonia gas which is sent into the ammonium carbonate and/or bicarbonate regeneration unit, (h) obtaining a $UO_3$ precipitate in the practically pure state, (i) neutralising the liquor freed from the uranium and containing a mixture of alkaline carbonate and/or bicarbonate and the majority of the $Na_2SO_4$ by means of an alkaline agent, preferably $NH_3$, in order to transform the $HCO_3^-$ ions possibly present into $CO_3^=$ ions, (j) passing the said neutralised liquor over a second anion-exchange resin which can be in the R—OH, $R_2CO_3$ or $RHCO_3$ form, preferably in the $RHCO_3$ form, at a temperature between the ambient temperate and 60° C. in order to fix the $SO_4^=$ ions and to obtain a liquor formed virtually completely by a mixture of alkaline carbonates and/or bicarbonates and, optionally, alkaline agents in the free state, (k) thermal decomposition of the ammonium carbonates and/or bicarbonates with release of all the ammonia gas and a proportion of the $CO_2$ in the presence of water vapour, which are subsequently regenerated in order to reconstitute the ammonium carbonate and/or bicarbonate, as well as obtaining a liquor containing a mixture of alkaline bicarbonate and carbonate, or again a mixture of alkaline carbonate and sodium hydroxide, (l) concentrating the said liquor obtained in this way so that its content of dry material is between 150 g/l and the saturation point at the ambient temperature, thus allowing it to be recycled to the attack of the ore, (m) eluting the $SO_4^=$ ions fixed by a solution containing one of the compounds of the ammonia group, ammonium carbonate and/or bicarbonate, at a temperature between the ambient temperature and 60° C., and giving a liquor containing all the $SO_4^=$ ions in the form of ammonium sulphate as well as a mixture of ammonia and ammonium carbonate or again of ammonium carbonate and bicarbonate, (n) thermal decomposition of the liquor containing all the $SO_4^=$ ions in the form of ammonium sulphate while liberating all the ammonia gas and the $CO_2$ in the presence of water vapour, subsequently regenerated in order to reconstitute the ammonium carbonate and/or bicarbonate, as well as obtaining a liquor containing only the $SO_4^=$ ions, (o) mixing the liquor containing the ammonium sulphate originating from the elution of the second anion-exchange resin and the liquor obtained during the separation of the ammonium uranate or diuranate and containing ammonium sulphate.

(p) causticisation of the mixture of liquors charged with ammonium sulphate originating from the said thermal decomposition and the separation of ammonium uranate and/or diuranate using lime with precipitation of the calcium sulphate and liberation of ammonia gas which is recycled in part to neutralise the attacking liquor which has been freed from uranium and to the zone where the ammonium carbonates and/or bicarbonates are generated, and obtaining a suspension of calcium sulphate in an ammoniacal liquor.

(q) collecting the calcium sulphate and the ammoniacal liquor recycled to the regeneration zone.

As is well known, the liquor originating from the attack of the uraniferous ore which has been freed from sterile materials is treated over a strong anion-exchange resin of the quaternary ammonium type such as $R—N(CH_3)_3^+$. The uranium consequently fixes on this resin in the form of a uranyl tricarbonate ion corresponding to the formula $UO_2(CO_3)_3^{4-}$, and can be eluted by means of an ammonium carbonate and/or bicarbonate solution at a concentration of between 1 and 2.5 M.

It is also possible to elute the uranium fixed on the resin using a solution of alkaline carbonate and/or bicarbonate. This process does however have the disadvantage of dissolving the uranium in the form of sodium uranyl tricarbonate, the uranium of which can be precipitated only in the presence of an excess of sodium, and this does not allow the uranium to be obtained later on and in a simple manner in the form of $UO_3$. Furthermore, it is no longer possible to separate the $SO_4^=$ ions present in the liquor which has been freed from uranium in a manner which is simple and economic and to recycle the carbonates remaining.

For these reasons, a solution containing uranium in the form of a carbonated complex of the $UO_2(CO_3)_3(NH_4)_4$ type and ammonium sulphate emanating from the $SO_4^=$ ions fixed on the resin at the same time as the uranium is collected.

The thermal decomplexion is important in itself because it allows the uranium to be precipitated quantitatively in the form of ammonium uranate or diuranate and permits the volatile $NH_3$ and $CO_2$ compounds to be released and recycled to a regeneration zone where the ammonium carbonate or bicarbonate used for eluting the uranium are synthesized in a known manner.

Although the uranium can be collected in the form of ammonium uranate or diuranate, it may be desirable to convert it into the form of $UO_3$ by calcination, thus allowing total recovery, except for losses, of the ammonia gas which is used in the entire uranium production cycle.

With regard to the liquor which has been freed from uranium but which contains alkaline carbonate and/or bicarbonate and the majority of the sodium sulphate in mixture, originating from the attack, it is neutralised by means of an alkaline agent, preferably $NH_3$, since the applicant has observed that the affinity of the $SO_4^=$ ions for the anion-exchange resins increased in proportion with the pH of the solution. Once the liquor has been neutralised in this way, it is treated with an anion-exchange resin which can be strong, fairly strong or weak, but preferably strong and of the quaternary ammonium type such $R—N(CH_3)_3^+$.

If the liquor which has been freed from uranium before passing over the anion-exchange resin is neutralised by ammonia gas or by an ammoniacal liquor, it is worth decomposing the ammonium carbonate formed in this way so as to obtain all the ammonia gas and a proportion of the $CO_2$ gas, this gaseous mixture being recycled into the ammonium carbonate and/or bicarbonate regeneration zone.

Consequently and since the liquor obtained is virtually free from $SO_4^=$ and $NH_4^+$ ions, it becomes possible to recycle this liquor to the attack of the ore after its concentration of alkaline carbonate and/or bicarbonate has been brought to the desired value for the said attack.

The $SO_4^=$ ions fixed on the second resin are eluted by means of a solution of ammonia, of ammonium carbonate or of ammonium bicarbonate but, preferably, by a solution of ammonium carbonate at a concentration of between 1 and 2.5 M in the form of ammonium sulphate.

The liquor containing the ammonium sulphate is then treated with lime in order to precipitate a calcium sulphate which, after filtration and rinsing, can be thrown out without polluting the environment, and in order to liberate the majority of the combined ammonia gas which has been recycled in part to neutralise the liquor which is freed from the uranyl ions and to the ammonium carbonate and/or bicarbonate regene ration zone.

The unliberated ammonia gas and the liquor originating from the filtration of calcium sulphate are recycled to the ammonium carbonate and/or bicarbonate regeneration zone.

Thus, the process according to the invention, which is a continuous process, turns out to be of particular value since it involves extracting and recovering the uranium from the starting ore, only throwing out the sterile materials and the sulphur originally contained in the ore in the form of a calcium sulphate, the said compounds being particularly inert toward the environment.

The other compounds intervening in the process are all recycled, apart from losses, into the various phases of conversion.

The process according to the invention will be understood better with reference to the FIGURE illustrating an embodiment.

The uraniferous ore containing the sulphur and the recycled attacking liquor $L_6$ are introduced into the attacking container A. The pulp obtained is separated at B into a cake $S_1$ and a liquor $L_1$ containing the uranium in soluble form, a mixture of alkaline carbonate and/or bicarbonate as well as sodium sulphate originating from the alkaline degradation of the mineral or organic sulphides. The cake $S_1$ resulting from the separation is washed and extracted from the cycle. It is essentially formed by siliceous compounds and by certain impurities which are insoluble in the attacking medium.

The uraniferous liquor $L_1$ is led to C where the uranium is fixed on the strong anion-exchange resin in carbonate or bicarbonate form at a temperature between the ambient temperature and 60° C.

The liquor $L_2$ which has been freed from uranium but still contains the alkaline carbonates and/or bicarbonates in solution as well as some sodium sulphate is collected at the outlet of C.

A liquor $L_{14}$ containing an ammonium carbonate and/or bicarbonate in solution is introduced at C where the fixed uranium is eluted by means of the liquor at a temperature between the ambient temperature and 60° C. in the form of a carbonated complex of the $UO_2(CO_3)_3(NH_4)_4$ type.

At the outlet of C, the liquor $L_7$ containing the uranium in the form of the above-mentioned complex is introduced at D where the thermal decomplexion of the uranium takes place at the boiling temperature of the liquor causing the precipitation of an ammonium uranate or diuranate as well as the liberation of all the $CO_2$, of a proportion of the ammonia and water vapour, thus forming the mixture $L_{10}$ which is sent toward G in order to regenerate the carbonate and/or bicarbonate required for the elution of the uranium.

The fraction $L_8$ also leaving D is, in fact, a suspension containing a solid phase formed by ammonium uranate or diuranate and a liquid phase, aqueous liquor containing ammonium sulphate in solution.

The two phases are thus separated at E into a cake $S_9$ formed by ammonium uranate or diuranate crystals and a liquor $L_9$ which is subsequently intended to be freed from the $SO_4^=$ ions.

The crystals forming the cake $S_9$ are introduced into a calcination zone F where the ammonium uranate or diuranate is thermally decomposed under the conditions known to the skilled man to give a $UO_3$ precipitate which is collected and ammonia gas $G_{11}$ which will subsequently be combined with the other liquors $L_{10}$ and $L_{12}$ to form the liquor $L_{13}$ which is collected at G at the same time as $G_{19}$, where the ammonium carbonates and/or bicarbonates, which are subsequently used for eluting the uranium at C and the $SO_4^=$ ions at I, are regenerated by blowing in $CO_2$.

As already mentioned, a liquor $L_2$, which is freed from uranium but still contains in solution the carbonates and/or bicarbonates originating from the attack as well as sodium sulphate, is collected at the outlet of C then introduced at H where it is neutralised, preferably by $NH_3$ brought by $G_{21}$, in order to convert the $HCO_3^-$ ions possibly present into $CO_3^=$. A liquor $L_3$ is thus obtained and is introduced into I where the $SO_4^=$ ions are fixed on a second anion-exchange resin at a temperature between the ambient temperature and 60° C.

At the outlet of I, a liquor $L_4$ which is free from $SO_4^=$ ions but contains almost all the mixture of alkaline carbonates and/or bicarbonates is introduced into J where the ammonium carbonates and/or bicarbonates are thermally decomposed with liberation along $G_{18}$ of all the ammonia gas and of a proportion of $CO_2$ in the presence of water vapour and production of a liquor $L_5$ containing either a mixture of alkaline bicarbonate or a mixture of alkaline carbonate and sodium hydroxide.

The liquor $L_5$ is brought into a concentration zone K where the alkaline carbonate and/or bicarbonate content is corrected so that the liquor $L_6$ leaving K and sent back to A has a suitable alkaline carbonate and/or bicarbonate content to allow the uraniferous ore to be attacked.

An elution liquor $L_{15}$ emanating from G and containing either ammonia or ammonium carbonate and/or bicarbonate is then introduced into I to allow the regeneration of the resin and the recovery of the $SO_4^=$ ions in the form of an aqueous liquor $L_{16}$ of ammonium sulphate.

At the outlet of I, the liquor $L_{16}$ is introduced into M where it is thermally decomposed, producing a gaseous effluent formed by all the ammonia, some $CO_2$ and water vapour which is sent via $G_{17}$ and combined with $G_{18}$ to form $G_{19}$ which is recycled toward the regeneration zone G.

At the outlet of M, the liquor $L_{24}$ is combined with the liquor $L_9$ originating from the separation E and containing ammonium sulphate also in solution. The liquors $L_{24}$ and $L_9$ constitute the liquor $L_{25}$ which is introduced at N where the ammonium sulphate is causticised by means of $Ca(OH)_2$ by a known method, thus producing a suspension $L_{26}$ of calcium sulphate in an ammoniacal liquor and a gaseous phase $G_{20}$ formed by ammonia gas, one part of which is passed into H along $G_{21}$ and the other part of which is combined with $L_{12}$ via $G_{22}$.

The suspension $L_{26}$ which has issued from N is introduced into P where the separation takes place of a solid phase $S_{23}$ formed by calcium sulphate which can be extracted and a liquid phase $L_{23}$ constituted by an ammoniacal liquor passed into G via $L_{12}$ to be recovered there.

EXAMPLE (Illustrated in the FIGURE)

A uraniferous liquor $L_1$ was treated according to the process of the invention after the attack of the ore at A and separation of the sterile materials $S_1$ at B.

100 m³/h of a solution having the following composition was thus obtained:

| | |
|---|---|
| Uranium | 2.1 g/l |
| $Na_2CO_3$ | 5.0 g/l |
| $NaHCO_3$ | 18.5 g/l |
| $Na_2SO_4$ | 21.3 g/l |

This liquor was introduced at C to the inlet of a group of three ion-exchange columns mounted in series and charged with a strong anion-exchange resin of the quaternary ammonium type corresponding to the formula $R-N(CH_3)_3HCO_3$. These three columns were used to fix the uranium, while a fourth column performed the elution treatment. The temperature of the liquor at the moment at which it passed over the resin was 25° C. The resin had a capacity of 1.40 equivalent to the liter.

A liquor $L_2$ which was free from uranium and which had the following composition:

| | |
|---|---|
| $Na_2CO_3$ | 5.00 g/l |
| $NaHCO_3$ | 22.45 g/l |
| $Na_2SO_4$ | 20.47 g/l | was collected at the outlet of the group of ion-exchange resins performing fixation and had an hourly flowrate of 100 m³/h.

At the same time, over a fourth column which was saturated with uranium during a previous operation, this metal was eluted by means of a liquor $L_{14}$ containing 93 g/l of ammonium bicarbonate, its flow-rate being 10 m³/h.

10 m³/h of a liquor $L_7$ which had the following average composition:

| | |
|---|---|
| $UO_2(CO_3)_3(NH_4)_4$ | 46.06 g/l |
| $NH_4HCO_3$ | 55.84 g/l |
| $(NH_4)_2SO_4$ | 7.75 g/l | was collected at the outlet of this fourth column. The liquor $L_7$ was then introduced into D where the $UO_2(-$ $CO_3)_3(NH_4)_4$ was thermally decomposed by heating the liquor to boiling point, thus causing the precipitation of ammonium diuranate corresponding to the formula $U_2O_7(NH_4)_2$, while

| | |
|---|---|
| 427.5 kg/h | $CO_2$ |
| 165.0 kg/h | $NH_3$ |
| 5.0 m³/h | $H_2O$ | where liberated to form the mixture $L_{10}$ which was recycled to G.

The fraction $L_8$ leaving D was formed by a suspension of ammonium diuranate in an ammonium sulphate solution.

After separation of the solid phases $S_9$ and liquid phase $L_9$ at E,

| | |
|---|---|
| 275.3 kg/h | of $U_2O_7(NH_4)_2$ representing the solid phase $S_9$ |
| 5.0 m³/h | of $(NH_4)_2SO_4$ at 11.5 g/l, representing the liquid phase $L_9$ were obtained. |

The cake $S_9$ was thus introduced into the calcination zone F where the ammonium diuranate was thermally decomposed at a temperature slightly below 400° C. under the conditions known to the skilled man, giving:

| | |
|---|---|
| 252.3 kg/h | $UO_3$ |
| 15.0 kg/h | $NH_3$ represented by $G_{11}$ | recycled to the ammonium bicarbonate and carbonate regeneration zone G.

Thus, the liquid fraction $L_{13}$ and gaseous fraction $G_{19}$ representing

| | |
|---|---|
| 1560.1 kg/h | expressed as $NH_3$ |
| 1847.3 kg/h | $CO_2$ |
| 5.0 m³/h | expressed as $H_2O$ | were treated at G by injection of 430.7 kg/h of $CO_2$ under the conditions known to the skilled man, thus allowing the regeneration of 930 kg/h of $HNH_4CO_3$ (ammonium bicarbonate) required for the elution of the uranium fixed at C and 3840 kg/h of $(NH_4)_2CO_3$ required for the elution of the $SO_4^=$ ions fixed at I on the anion-exchange resins.

During this period, the three columns in series, charged with strong anion-exchange resin, fixed the uranium on the said resin.

A liquor $L_2$, free from the uranium and representing an hourly flow-rate of 100 m³/h, was collected at the outlet of C and was neutralised at H by 454.3 kg/h of $NH_3$. A liquor $L_3$ representing an hourly flow-rate of 100 m³/h and having the following composition:

| | |
|---|---|
| $Na_2SO_4$ | 20.47 g/l |
| $Na_2CO_3$ | 19.17 g/l |
| $(NH_4)_2CO_3$ | 12.83 g/l | was thus obtained. This liquor $L_3$ was introduced at I into a group of three columns in series, fixing the $SO_4^=$ ions on a second anion-exchange resin having a capacity of 1.4 equivalent to the liter.

The liquor $L_3$ was introduced at I at a temperature of 30° C.

At the outlet of I, a liquor $L_4$ free from $SO_4^=$ ions was sent to J to be thermally decomposed at boiling point, thus liberating:

| | |
|---|---|
| $NH_3$ | 454.3 kg/h |
| $CO_2$ | 294.0 kg/h | which was recycled via $G_{18}$ to the regeneration zone G.

At the outlet of J, the liquor $L_5$ representing an hourly flow-rate of 100 m³/h had the following composition:

| | |
|---|---|
| $NaHCO_3$ | 11.24 g/l |
| $Na_2CO_3$ | 27.35 g/l |

As a result of the evaporation of 75 m³/h of water, the liquor $L_6$ leaving K had the concentration desired for the attack of the uraniferous ore, that is to say about 150 g/l of dry materials.

While the $SO_4^=$ ions were being fixed over the three columns in series, this ion was eluted over a fourth column saturated in $SO_4^=$ ions during a preceding operation by means of a liquor $L_{15}$ containing 192 g/l of $(NH_4)_2CO_3$ and at a hourly flow-rate of 20 m³/h.

20 m³/h of a liquor $L_{16}$ were collected at the outlet of this elution column.

The liquor $L_{16}$ had the following composition:

| | |
|---|---|
| $(NH_4)_2CO_3$ | 122.82 g/l |
| $(NH_4)_2SO_4$ | 95.12 g/l |

The liquor $L_{16}$ was then decomposed at M by heating to boiling point, giving:

| | |
|---|---|
| $NH_3$ | 870.0 kg/h |
| $CO_2$ | 1125.8 kg/h | and a liquor $L_{24}$, representing a hourly flow-rate of 20 m³/h. and containing 122.82 g/l of $(NH_4)_2SO_4$.

This liquor $L_{24}$ was mixed with 5 m³/h of the liquor $L_9$ emanating from the separation at E of the ammonium diuranates which contained 15.5 g/l of $(NH_4)_2SO_4$.

The mixing of the liquors $L_{24}$ and $L_9$ gave the liquor $L_{25}$, introduced at N were causticisation took place by addition of 1110 kg/h of $Ca(OH)_2$ under the conditions well known to the skilled man, causing the precipitation of 2040 kg/h of $CaSO_4$ and the recovery at P of an aqueous solution at an hourly flow-rate of 25 m³/h which were sent to G along $L_{23}$ to regenerate the ammonium carbonate and bicarbonate.

It thus appears that the process according to the invention, as applied in this example, is of particular value since it was possible to eliminate the sterile materials from a sulphur-containing uraniferous ore, to obtain the uranium in oxidised form $UO_3$ and to extract the $SO_4^=$ ions corresponding to the sulphur initially contained in the ore in the form of a calcium sulphate precipitate having the advantage of being able to be cast into the environment without damaging the environment.

Consequently, it is no longer necessary to throw out the liquid sodium and ammonium effluents since they are integrally recycled in the entire process.

I claim:

1. A process for the recovery of uranium values from liquor resulting from the attack of sulphur containing uraniferous ores by an alkaline solution of sodium carbonate and/or sodium bicarbonate wherein the resulting liquor contains sodium carbonate and/or bicarbonate and sodium sulphate in addition to uranium values, the steps of (1) contacting the liquor with an ion exchange resin on which uranium values become fixed, leaving a liquor freed from uranium values while still containing sodium carbonate and/or bicarbonate and sodium sulphate;

(2) eluting the ion exchange resin with a solution of ammonium carbonate and/or bicarbonate to provide an elutant containing the uranium values as ammonium uranyl tricarbonate, ammonium carbonate and/or bicarbonate and ammonium sulphate;

(3) heating the eluant from step (2) to boiling to convert the ammonium uranyl tricarbonate to ammonium uranate and/or diuranate as a precipitate, with the release of $NH_3$, $CO_2$ and $H_2O$ as vapors;

(4) separating the precipitated ammonium uranate and/or diuranate from the liquor remaining in step (3) which still contains ammonium sulphate;

(5) calcining the ammonium uranate and/or diuranate from step (4) to convert the uranate and/or diuranate to uranium oxide $UO_3$ while giving off vapors of ammonia.

2. A process as claimed in claim 1 in which the ion exchange resin is a strong ion exchange resin of the quarternary ammonium type.

3. A process as claimed in claim 1 in which the solution with which the elution step is carried out in step (2) contains ammonium carbonate and/or bicarbonate in a concentration within the range of 1–2.5 molar.

4. A process as claimed in claim 1 which includes the step of (6) absorbing the vapors from step (3) in water to regenerate a liquor for use as an elutant.

5. A process as claimed in claim 4 in which the ammonia released in step (5) is taken up in aqueous medium for recycle with the regenerated liquor in step (6).

6. A process as claimed in claim 1 or claim 4 which includes regenerating the liquor freed from uranium values in step (1) comprising the steps of (7) neutralizing the liquor (8) contacting the liquor from step (7) with an anion exchange resin whereby the $SO_4^=$ ions become fixed on the resin yielding a liquor freed of $SO_4^=$;

(9) subjecting the liquor from step (8) to thermal decomposition to release $NH_3$, $CO_2$;

(10) concentrating the product from step (9) to produce a liquor which can be used in the attack of the uraniferous ore.

7. A process as claimed in claim 6 in which the liquor is neutralized in step (7) with ammonia.

8. A process as claimed in claim 6 which includes the recovery of the $SO_4^=$ fixed onto the ion exchange resin in step (8) comprising the steps of

(11) removing the $SO_4^=$ ions from the ion exchange resin by eluting with a solution of ammonia, ammonium carbonate or bicarbonate to yield a solution containing ammonium carbonate and/or bicarbonate and ammonium sulphate;

(12) subjecting the solution from step (11) to thermal decomposition to drive off $NH_3$ and $CO_2$ leaving ammonium sulphate;

(13) adding CaOH to the solution of ammonium sulphate from step (12) to precipitate the sulphate as calcium sulphate;

(14) separating the precipitated calcium sulphate produced in step (13).

9. A process as claimed in claim 8 in which the ammonia, ammonium carbonate or bicarbonate is present in the eluting solution in step (11) in a concentration of 1–2.5 molar.

10. A process as claimed in claim 8 in which the ammonium sulphate released in step (4) is combined with an ammonium sulphate solution from step (12) for causticization in step (13).

11. A process as claimed in claim 8 in which ammonia vapors are eliminated during the causticization in step (13) and which includes the step of recycle of the liberated ammonia to step (6) for neutralization of the liquor from step (1).

12. A process as claimed in claim 8 in which the causticizing step (13) results in the precipitate of calcium sulphate in suspension in a solution of ammonia liquor and which includes the step of recycling the ammonia liquor separated by step (13) to the neutralization of the liquor in step (6).

13. A process as claimed in claim 8 in which the ammonia liquor from step (13) is regenerated by the addition of $CO_2$ and which includes the step of recycling the regenerated liquor to the elution step (2).

14. A process as claimed in claim 1 in which the ion exchange resin is a strong anion exchange resin of the $R-N(CH_3)_3^+$ type.

15. A process as claimed in claim 1 in which the contact with the ion exchange resin in step (1) and the elution of the ion exchange resin in step (2) is carried out at a temperature between the ambient temperature and 60° C.

16. A process as claimed in claim 6 in which the ion exchange resin in step (8) is a strong anion exchange resin of the quarternary ammonium type.

* * * * *